July 28, 1936.　　　C. B. KURTZ　　　2,049,301
CONTROL MECHANISM
Filed Nov. 26, 1934　　　3 Sheets-Sheet 1

Inventor
CYRUS B. KURTZ.
Richey & Watts
Attorney

July 28, 1936. C. B. KURTZ 2,049,301
CONTROL MECHANISM
Filed Nov. 26, 1934 3 Sheets-Sheet 3

Inventor
CYRUS B. KURTZ.
By Richey & Watts
Attorney

Patented July 28, 1936

2,049,301

UNITED STATES PATENT OFFICE 2,049,301

CONTROL MECHANISM

Cyrus B. Kurtz, Cleveland, Ohio, assignor to Charles Carter, trustee

Application November 26, 1934, Serial No. 754,794

30 Claims. (Cl. 180—64)

This invention relates to control mechanism and is exemplified herein and more particularly described in an improved clutch control mechanism especially adapted for use in a motor vehicle, in which the motor unit and clutch are resiliently mounted.

In the manufacture of motor vehicles it has become common practice to mount the motor in the vehicle frame on resilient supports to cushion the frame and motor with respect to each other to prevent the prevent the transmission of vibrations and torque reactions therebetween. It is also desirable and conventional to construct the motor and clutch mechanism as a unit, and where such construction is combined with a resiliently mounted motor, the clutch mechanism and motor oscillate and move in unison with respect to the frame.

The clutch mechanism is usually provided with a yoke lever or torque shaft thereon to effect the release of the engageable clutch parts, and to render the clutch manually operable it is necessary to extend a control means from the clutch shaft to a position conveniently accessible to the operator. Ordinarily the control means is actuated by a clutch pedal mounted on the frame or other relatively fixed part of the vehicle, and is actuated by the foot of the operator.

The direction and magnitude of the movements of a resiliently mounted motor may vary according to the type of mounting, the torque reactions, and the inertia or momentum of the motor. For example, depending on the forces involved and the type of mounting, the engine may move in a fore and aft direction, may have lateral movement, may have vertical movement, may rotate or oscillate, or my partake of a combination of all of the above movements. The transmission of the motor movements to the clutch pedal through the clutch control means heretofore employed have seriously impaired and interfered with the successful operation of the clutch mechanism.

Where a rigid positive connection is maintained between the clutch pedal and the clutch shaft, any bodily movement of the motor with respect to the pedal will result in a pedal movement, or if the pedal is held against movement by the operator, the motor movement will cause, through reaction with the control means, an involuntary engagement or release of the clutch. Such involuntary clutch action without movement of the clutch pedal by the operator prevents proper control of the clutch mechanism by the operator.

For the purpose of illustrating and describing my invention I will refer to it in the environment of a motor vehicle of the resiliently mounted motor type above described, but those skilled in the art will appreciate that the application of the principles of my control mechanism or the mechanism itself may well be adapted to other and varied uses.

It is among the objects of my invention to provide a control mechanism between a clutch pedal actuable about a relatively fixed axis and a relatively movably mounted clutch mechanism, which will compensate for all bodily movements of the clutch mechanism relative to the axis of the clutch pedal to prevent the transmission of such movements to the clutch pedal, and which will positively transmit voluntary movement of the clutch pedal to the clutch mechanism to actuate the same, all free from involuntary action of the clutch due to its bodily movement relative to the axis of the clutch pedal.

Another object of my invention is to provide a compensating linkage which will respond to movement of the clutch pedal by the driver of the vehicle to transmit such pedal movements directly to the clutch mechanism and to maintain a constant relationship between the clutch pedal and clutch parts irrespective of all bodily movements of the clutch mechanism.

Another object of my invention is to provide a compensating linkage which will directly move the actuated member in the same direction and with the same directional force as imparted to the linkage by the actuator.

Another object of my invention is to provide a control mechanism which, when interposed between a movable member or mechanism and a member or mechanism to be moved thereby, between which members or mechanisms relative bodily movements take place which might otherwise cause involuntary movements between said members or mechanisms, will compensate for all involuntary movements between said members or mechanisms, while maintaining and facilitating the transmission of all desired voluntary movements between said members or mechanisms.

Another object of my invention is to provide a control mechanism which, while compensating for the involuntary movements according to the foregoing objects, will also provide a resistance to bodily movement of the controlled or actuated member in response to positive voluntary movement of the controlling or actuating member.

Another object of the invention is to provide a control mechanism adapted to carry out the objects outlined above and to be operative between a clutch release lever arranged parallel to the axis of oscillation of a resiliently mounted motor and a relatively fixed clutch pedal mounting.

Other objects of my invention are to provide a control mechanism or compensating linkage which is simple in construction, light in weight, compact in size, economical of manufacture, and durable and dependable in operation. Another object is to provide a compensating linkage which can readily be adapted to various uses and types of installations.

Further objects and advantages of the invention will become apparent as the description proceeds, reference being made to the drawings wherein I have illustrated various preferred forms of my invention, and in which:—

Certain parts of the clutch control mechanisms are common to each of the various modifications shown in the drawings, and for convenience will be referred to by the same numerals throughout the description.

Figure 1:
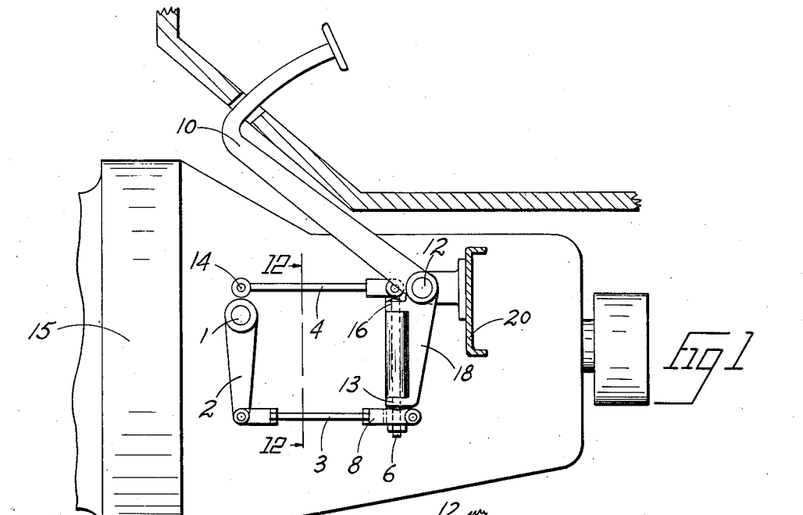
Figure 1 is an elevation showing a preferred embodiment of the clutch control of my invention.
Figures 2, 3, 14:
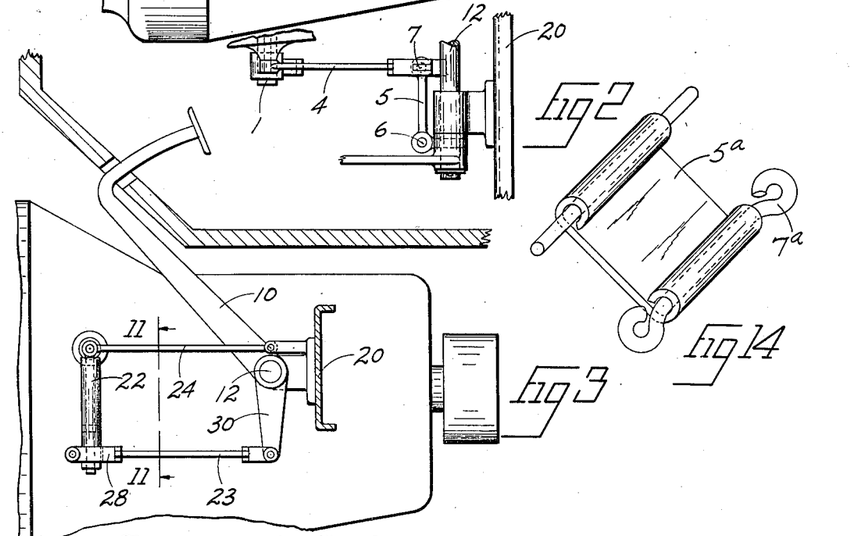
Figure 2 is a plan view of the species illustrated in Figure 1.
Figure 3 is an elevation of a modified form of the clutch control mechanism.
Figure 14 is a perspective showing of a modified form of torque plate and pin construction.

In the preferred form of clutch control mechanism illustrated in Figures 1 and 2, a clutch shaft 1 extends outwardly from the bell housing 15 supported by a resiliently mounted motor (not shown) and carries thereon at its outer extremity a clutch release lever 2 which is adapted to turn the clutch shaft to effect engagement and disengagement of the clutch parts. Mounted upon the frame 20 or other relatively fixed part of the vehicle by means of a shaft 12 and spaced rearwardly with respect to the clutch shaft 1, is a clutch pedal 10 which may rotate about the axis of the shaft 12 in response to pedal actuation by the operator.

The clutch pedal 10 extends below its point of attachment with shaft 12 as at 18, and preferably carries thereon adjacent its lower end a portion 13 that is apertured to receive the lower end of a pivot pin 6. Above the apertured portion 13 and integral with the pedal 10 an apertured bracket 16 may be provided and the two apertured parts cooperate to support a pin 6 mounted in a bearing sleeve on a torque member or plate 5. In this modification, as well as in various modifications described below, I have shown the torque plate as being supported on the shaft on which the clutch pedal is mounted. Obviously the torque member may be mounted on an auxiliary shaft which may be connected to the clutch pedal by any ordinary linkage. Such a construction may be desirable for some types of installations.

Although I have illustrated the torque member in the form of a flat plate 5 connecting a pair of parallel pin bearing sleeves, it will be understood as the functions of the torque member are hereinafter described, that a rigid shaft or other torque transmitting means may be pivotally carried by the supporting member to operatively support the links.

The side of the torque member 5 spaced from the clutch pedal 10 is also provided with a bearing sleeve and rotatably supports therein a pin 7 which is pivotally connected at one end to a thrust or reaction link 4 and is pivotally connected at the other end to an actuating link 3. The actuating link 3 is pivoted at its forward end to the clutch release lever 2. The thrust link 4 extends forward from the plate 5 substantially parallel to the link 3 and is pivoted to the housing 15 as at 14. The links 3 and 4 are substantially the same length and in conjunction with the torque member 5 and lever 2 form a parallel linkage between the clutch pedal and clutch shaft. The pivotal connections between the housing 15 and the link 4 as at 14 and between the link 3 and the clutch release lever 2 are preferably sufficiently loose to permit a limited lateral swinging movement of the links with respect to the housing.

Conventional pin and clevis or other analogous pivotal connections may be employed throughout the linkage to connect the links to the pins of the torque plate, to the clutch pedal or to the clutch lever. To facilitate assembly of the linkage, however, one end of the torque plate pin 7 is formed with a bearing aperture to receive a clevis pin, and the other end is removably fitted with a block 8 provided with a bearing aperture to receive a clevis pin.

As an example of an alternative form of link-to-pin connection, both ends of the pin 7 may be formed with a bearing aperture after the shank of the pin is positioned in the bearing sleeve, or, as illustrated in Fig. 14, the sleeve on the plate 5a may be rolled about a pin 7a provided with a bearing aperture at each end.

From the above described compensating linkage it will appear that any fore and aft motion of the clutch shaft 1 with respect to the frame and the clutch pedal shaft 12 will through the actuating link 3 swing the torque member or plate 5 about the pivot pin 6 on the clutch pedal, and since the plate 5 is free to rotate, the said fore and aft motion will not produce any movement of the clutch pedal. Any vertical movement of the clutch shaft 1 with respect to the pedal shaft 12 will raise or lower the forward ends of links 3 and 4, and the pivotal connections between the links and the pin 7 will permit the links 3 and 4 to swing freely without producing any movement of the clutch pedal 10. Any lateral swinging of the links 3 and 4 caused by lateral bodily movement of the housing, will merely turn the pin 7 within its bearing on plate 5, and thus will not influence any movement of the plate 5 or pedal 10.

A positive movement of the clutch pedal 10, in response to actuation by the operator, will swing the pin 6 therewith and through the torque member 5 swing the pin 7 therewith. The upper end of pin 7 is restrained from forward movement by the thrust or reaction link 4, the lower end is constrained to move rearwardly in unison with the lower end of pin 6 on the clutch pedal and thus through the actuating link 3 a positive actuation of the clutch is brought about. Regardless of the amount of positive pedal actuation, the relationship between the clutch pedal and the clutch lever is substantially unchanged by bodily movements or oscillations of the clutch shaft.

Figure 4:
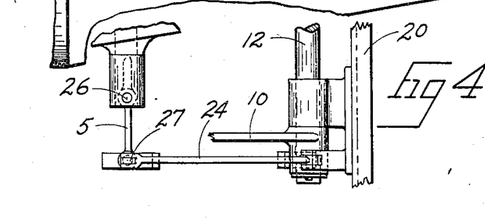
Figure 4 is a plan view of the modification shown in Figure 3.

The form of clutch control mechanism shown in Figures 3 and 4 is substantially a reversal of the torque plate and linkage arrangement shown in the species of Figure 1 and is adapted for use where space will not permit a pedal mounting of the torque plate as in the preferred embodiment.

In this modification the torque member 5 is mounted on the clutch shaft lever 22 by means of the pin 26 extending through the clutch shaft lever 22, the clutch shaft 1, and into an apertured extremity of the clutch shaft lever. This mounting of the pin 26 performs the double function of securing the lever 22 to the shaft 1 and pivotally supporting the plate 5 through a bearing sleeve thereon. The other bearing sleeve on the torque member receives the pin 27 which is pivotally connected at the lower end thereof to the actuating link 23, and at the upper end thereof to the thrust or reaction link 24. The lower connection between the actuating link 23 and the pin 27 is effected by means of a removable clevis block 28.

The clutch pedal 10, secured to a shaft 12 on the frame 20, in the usual manner, is provided with a portion 30 extended below the point of attachment to the shaft 12, and the actuating link 23 extending rearwardly from the torque member 5 is pivoted to the pedal extension 30. The thrust link 24 is arranged substantially parallel to the actuating link, extends rearwardly from the upper end of the plate pin 27 and is pivoted to the frame 20 adjacent the shaft 12. As in the first embodiment, the pivotal connections are sufficiently loose to permit a limited lateral swinging of the links.

In the clutch control mechanism of this form, any fore and aft movement of the clutch shaft 1 with respect to the frame of the vehicle will cause the plate 5 to turn upon the pin 27 as an axis. The rotation of the plate on pin 27 is unrestrained and ineffective to produce any movement in the links 23—24 or the pedal 10. Vertical movement of the clutch shaft 1 will move the plate 5 carried thereby, and since the links 23 and 24 are pivoted to the pedal part 30 and the frame respectively, they are free to swing in response to the vertical movement of the clutch shaft 1 and are ineffective to cause any movement of the pedal 10.

Lateral bodily movement of the motor will swing the links on this pivot pin in the torque plate 5 and on their loose pivot connection with the frame and pedal and will not affect pedal movement.

When the pedal 10 is positively moved by the operator of the vehicle, the lower end of the extension 30 moves rearwardly and carries therewith the actuating link 23 and through the pin 27 exerts a rearward pull on the torque member or plate 5. Any tendency of the plate 5 to turn on pin 26 as an axis is resisted by the thrust or reaction link 24 which extends from the upper end of the pin 27 to the frame. The rearward pull exerted by the actuating link 23 on the plate thus produces a turning moment or torque in the plate 5 that is transmitted through the pin 26 to the clutch shaft lever 22. The lever 22 and torque member 5 turn in unison about the axis of the clutch shaft 1 to control clutch engagement or disengagement as heretofore described.

Figure 5:
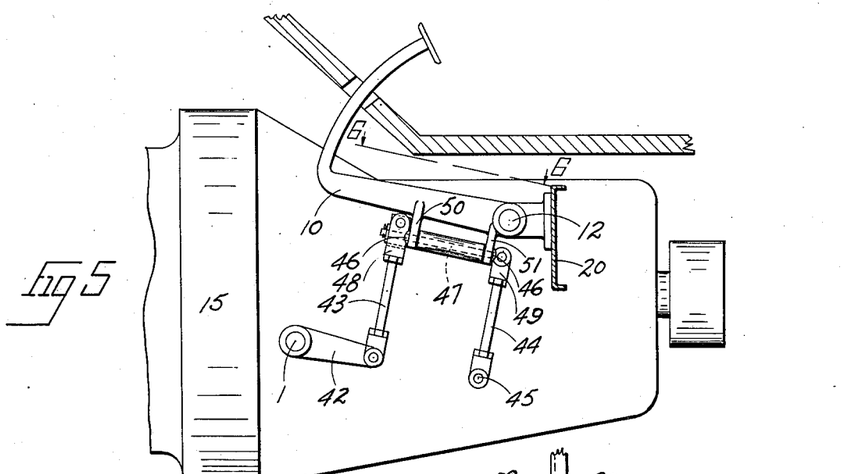
Figure 5 is an elevation showing another modification of the clutch control mechanism.
Figures 6, 7, 8:
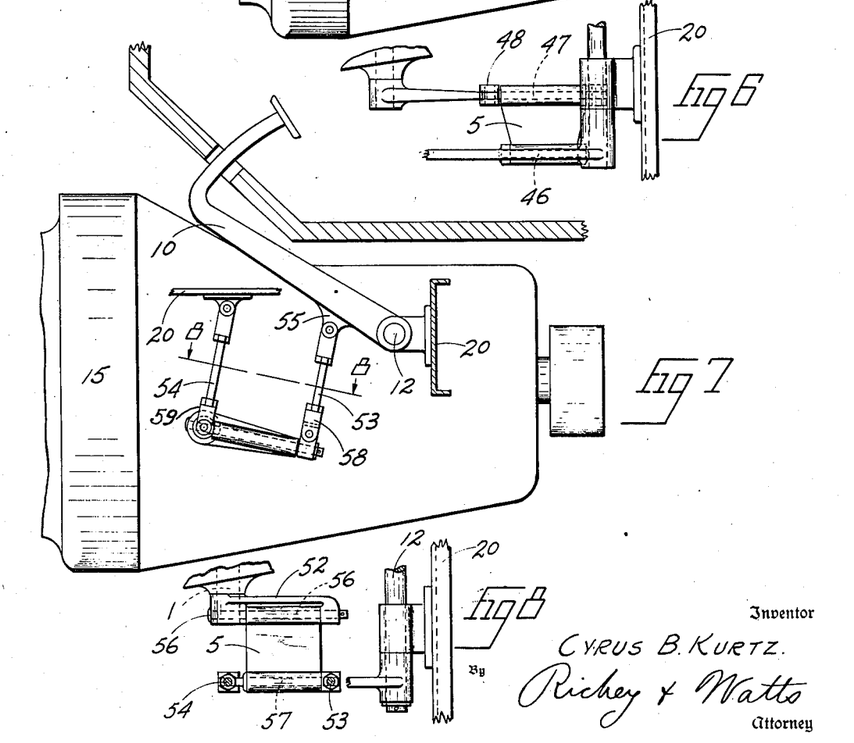
Figure 6 is a plan view of the modification illustrated in Figure 5, and indicated by the line 6—6 of Fig. 5.
Figure 7 is an elevation of a further modification of the clutch mechanism.
Figure 8 is a plan view of the form illustrated in Figure 7, taken along the line 8—8 of Fig. 7.

The modification of the clutch control mechanism illustrated in Figures 5 and 6 is one that is especially adapted to control a clutch shaft where the clutch release lever is arranged substantially parallel to the axis of oscillation of a resiliently mounted motor.

The outer end of the clutch shaft 1 is provided with a clutch release lever 42 arranged parallel to the axis of motor oscillation and is pivotally connected at its extremity to an actuating link 43 as in the preferred embodiment of my invention. The clutch pedal 10 mounted on a shaft 12 supported by the frame in the usual manner, is formed to provide on the lower side thereof a pair of spaced brackets 50 and 51 which are apertured to receive therein a torque plate pin 46. The torque member or plate 5 is pivotally connected through a sleeve thereon and a pin 46 to the clutch pedal, and extends laterally from the pedal to support thereon in the other bearing sleeve a pin 47.

It will be understood that the position of the brackets 50—51 with respect to the axis of the pedal shaft may be varied to effect changes in leverage action.

The pin 47 may be pivotally connected at one end through the removable clevis block 48 to the actuating link 43, and at the other end through the clevis 49 to the reaction link 44, which is pivoted to the housing as at 45. The links 43 and 44, the plate 5, and release lever 42 are thus arranged to produce a parallel linkage as in the preferred embodiment of the invention.

Any fore and aft motion of the motor and housing and shaft 1 carried thereby will cause the actuating link 43 to swing about its pivotal connection with the pin 47 without effecting any substantial movement of the pin 47 or of the plate 5 associated therewith. Vertical movement of the shaft resulting from the oscillation of the motor on its axis will cause the clutch shaft 1 and the links 43 and 44 to move in unison therewith and will turn the plate 5 about the pin 46 as an axis, but will be ineffective to produce any movement of the clutch pedal 10. Lateral movement of the housing and shaft 1 thereon will cause the links 44 and 43 to swing with respect to the housing on their loose pivots and turn the pin 47 within the sleeve bearing in the plate 5, but will be ineffective to move the plate 5 or the pedal 10 associated therewith. From the foregoing description of the modification shown in Figures 5 and 6, it is apparent that the motor and housing 15 and the shaft 1 carried therewith may oscillate freely without effecting any movement of the clutch pedal 10.

Movement of the clutch pedal 10 in response to actuation by the operator causes the pin 46 carried thereby to turn the plate 5 therewith about the axis of shaft 12. The reaction link 44 connected with the plate 5 through the pin 47 opposes free turning of the plate 5 on the pin 46 as an axis and the resulting torque in the plate is transmitted through the pin 47 to the actuating link 43. The actuating link 43 is moved downward by the turning of the plate and through the clutch release lever 42 positively actuates the clutch.

The modification of the clutch control mechanism illustrated in Figures 7 and 8 is similar to the species illustrated in Figure 3 in that the torque member or plate 5 is carried on an arm integral with the clutch shaft 1, and is similar to the species illustrated in Figure 5 in that the axis of the clutch release lever is parallel to the axis of oscillation of the motor.

In the species of linkage control mechanism of Figure 7 the clutch release lever is connected to the clutch shaft by the pin 56, and supports the torque members as heretofore described in connection with the description of the species illustrated in Figures 3 and 4.

The clutch pedal 10 is mounted on a shaft 12 carried by the frame as heretofore described and is formed on its underside with an apertured bracket 55 which is pivotally connected to an actuating link 53. The actuating link 53 extends downwardly from the clutch pedal bracket 55 and through the removable clevis 58 is pivoted to the rearward end of the plate pin 57. The link 54 is pivoted at one end to a bracket on the frame 20 and at the other end is pivotally connected to the forward end of the pin 57 on the torque member 5. The pivotal connections between the reaction link 54 and the frame, and between the actuating link 53 and the pedal are sufficiently loose to permit necessary lateral link movement.

The links 53 and 54 are substantially parallel to each other, are about the same length, and in conjunction with the clutch release lever 52 and clutch pedal 10 form a linkage that in its operative effect is a parallel linkage.

Fore and aft movement of the motor and housing 15 and the shaft 1 thereon will carry the plate 5 and pin 57 therewith, and due to the pivotal connection between the link 54 and the frame, the plate 5 is free to move with respect to the frame. Since the actuating link 53 is pivoted to bracket 55, the actuating link is free to swing on its pivot to accommodate the above mentioned fore and aft movements of the plate 5 without reacting to move the clutch pedal 10. Vertical movement of the clutch shaft 1 or oscillation of the motor on its axis of oscillation will merely cause the plate 5 to turn on the pin 57 as an axis without effecting any movement of the links 53—54 or the clutch pedal 10. Lateral movement is compensated for by lateral swinging of the links.

Positive actuation of the clutch pedal 10 will turn said pedal on its axis and move the actuating link 53 associated therewith downwardly to move the torque member or plate 5. Downward movement of the torque member or plate 5 is restrained by link 54 and the resulting torque reaction in the plate 5 will be transmitted through the pin 56 to the clutch release lever 52. The pivotal axis of the clevis 59 on link 54 is substantially in alignment with the axis of clutch shaft 1 and thus the plate 5 and clutch release lever 52 turn together about the same axis to control the clutch.

Figure 9:
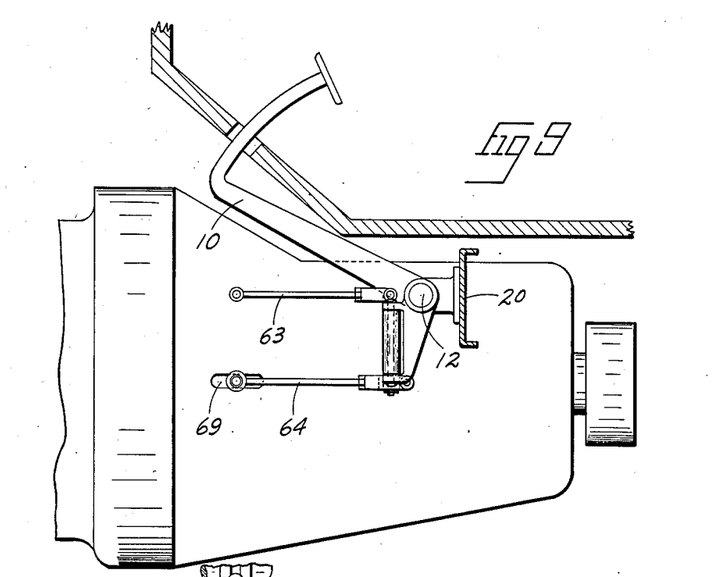
Figure 9 is an elevation of a form of clutch control mechanism especially adapted for use with a clutch lever of the yoke or fork type.

The form of clutch control mechanism illustrated in Figure 9 is especially adapted for use in connection with a clutch control lever designed to pivot about a substantially vertical axis.

Figures 10, 11, 12, 13:
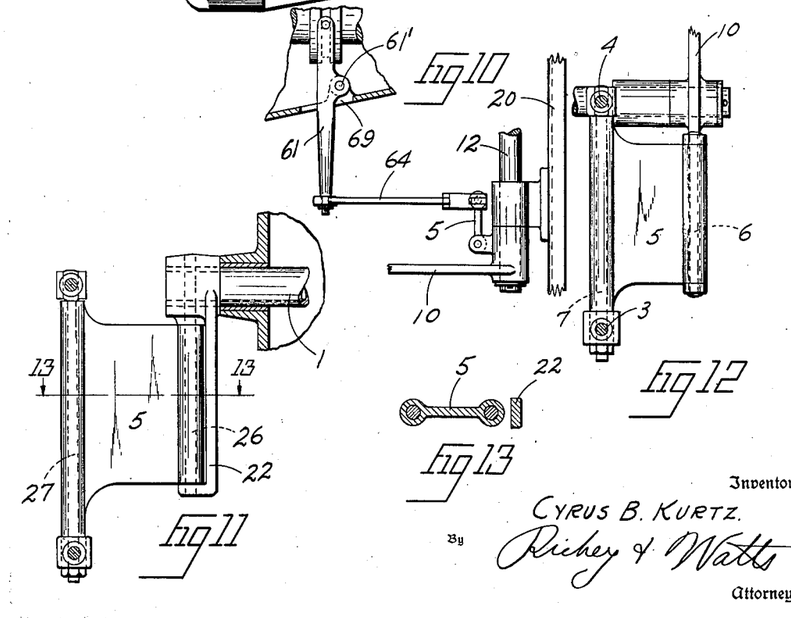
Figure 10 is a plan view of the form shown in Figure 9.
Figure 11 is a section taken on line 11—11 of Figure 3.
Figure 12 is a section taken on line 12—12 of Figure 1.
Figure 13 is a section taken on line 13—13 of Figure 11.

The pedal mounting and actuating mechanism is substantially the same as that employed in the first described embodiment of my invention. The torque member 5 is supported by the clutch pedal 10 and the usual thrust and actuating links 63 and 64 are carried thereby. The actuating link extends forwardly from the torque plate 5 and pivotally engages at its forward end the clutch actuating lever 61. The pivotal connection between the link 64 and the lever 61 is such as to permit the necessary lateral swinging. The clutch actuating lever 61 constitutes the outer end of a yoke or form common to certain types of clutches and may be pivoted on a substantially vertical pivot bearing shown as a pin 61' in the clutch bell housing. The bell housing is ordinarily slotted as at 69 to permit the actuating movements of the lever 61.

This type of control mechanism compensates for motor movements and is actuated by the pedal in the manner heretofore described in detail in connection with the description of the embodiment of my invention and illustrated at Figs. 1 and 2 of the drawings.

In general, the operation of each of the clutch control mechanisms described above is the same in that they each provide a compensating linkage connection between the clutch pedal and the clutch control lever that will compensate for all motor movements to prevent such movements from interfering with proper control of the clutch. In each of the modifications the motor and clutch shaft may move in any direction without causing a movement of the clutch pedal, and yet any positive actuation of the clutch pedal by the operator will positively move the clutch control lever. In each of the embodiments shown and described the actuating links employed to transmit the movement of the pedal to the clutch mechanism and the reaction links employed to translate the actuating movements to torque in the plate are preferably proportioned to minimize their angular displacement and are substantially parallel to each other.

It may appear that the linkages above described, through variations in radii or other characteristics, would produce theoretically forces tending to exert a binding action or restraining influence on the movements described, but those skilled in the art will appreciate that the clearances between the pins and bearings selected would in effect compensate for departures from exact parallel linkages. In control mechanism constructed as above described, conventional pin and clevis connection clearances have been found suitable.

Although preferred embodiments of the invention have been described in considerable detail, those skilled in the art will appreciate that various modifications and adaptations of my invention to other uses can be made without departing from the spirit and scope thereof. It is, therefore, to be understood that my invention is not limited to the disclosures herein, or in any manner other than by the appended claims, when given the range of equivalents to which my patent may be entitled.

I claim:

1. In combination, a motor vehicle frame, a motor so mounted as to oscillate therein on an axis, a clutch shaft mounted to oscillate therewith, a release lever on said clutch shaft substantially parallel to the axis of motor oscillation, a shaft on said frame provided with a pedal, a torque member pivoted to said pedal on an axis disposed at an angle to the axis of said pedal and movable therewith, an actuating link connecting said torque member and said clutch release lever, and a reaction link pivoted to said torque member at one end and connected to a pivot movable with the clutch shaft at the other end.

2. In combination, a motor vehicle frame, a motor mounted to oscillate therein on an axis, a clutch shaft mounted to oscillate therewith, a release lever on said clutch shaft parallel to the axis of motor oscillation. a shaft on said frame provided with a pedal, a torque member pivoted to said release lever on an axis disposed at an angle to a plane through the axis of said release lever and movable therewith, an actuating link connecting said torque member and said pedal, and a reaction link pivoted to said torque member at one end and pivoted to said vehicle frame at the other end.

3. In combination, a motor vehicle frame, a movably mounted motor and clutch mechanism in said frame, a shaft on said clutch mechanism provided with a release lever, a clutch pedal mounted on said frame, a torque transmitting means pivotally supported on said pedal by brackets spaced from the pedal axis, a reaction link connected to said torque means and to a pivot movable with the clutch shaft, and an actuating link connected to said torque means and to said lever to move said lever in response to pedal movement.

4. In combination, a motor vehicle frame, a movably mounted motor therein, a clutch release lever thereon and movable therewith, a clutch pedal rotatably mounted on said frame, a clutch control mechanism arranged between said clutch release lever and said pedal comprising, a member mounted on the clutch pedal on an axis disposed at an angle to the axis of clutch pedal rotation to move bodily with said clutch pedal, said member being rotatable with respect to said clutch pedal about the axis of said member, means connecting said member to said clutch release lever and a reaction means movable with said motor to control the rotation of said member.

5. In combination, a motor vehicle frame, a movably mounted motor therein, a clutch release member mounted to move with said motor, said member rotatable about a substantially vertical pivot to effect clutch actuation, a clutch pedal rotatably mounted on said frame, a control arranged between said pedal and said release member, said control comprising a torque transmitting means mounted on said pedal to move bodily therewith about the axis of pedal rotation, said means being pivoted on said pedal to move with respect to the pedal, an actuating member connecting said means and said clutch release member, and a reaction means engaging said torque transmitting means to restrain motor movement in response to pedal movement.

6. In combination, a motor vehicle frame, a motor movably mounted therein, a clutch release lever mounted to move with said motor, a clutch pedal rotatably mounted on said frame, a bearing bracket fixed to said pedal, a torque plate pivotally mounted in said bracket on an axis disposed at an angle to a plane through the axis of pedal rotation, a bearing sleeve on said plate spaced from said pivot axis, a pin in said sleeve rotatably connected to an actuating link and a reaction link, said actuating link connected to said clutch release lever, said reaction link connected to a pivot adjacent the clutch release lever, said links arranged substantially parallel.

7. In combination, a motor vehicle frame, a movably mounted motor and clutch mechanism in said frame, a shaft on said clutch mechanism provided with a release lever, a clutch pedal rotatably mounted on said frame, said pedal extended below the pedal-to-frame connection, torque transmitting means pivotally supported by said lever and movably bodily therewith, an actuating link connecting said means and said pedal extension, and a reaction link pivoted to the frame adjacent the pedal mounting and pivoted to said means.

8. In combination, a motor vehicle frame, a movably mounted motor and clutch mechanism in said frame, an actuable lever on said clutch mechanism, an actuating pedal mounted on a shaft fixed to said frame, a control mechanism arranged between said pedal and said clutch to transmit voluntary pedal movements to the lever and to prevent the transmission of involuntary bodily movements of the clutch shaft, comprising a torque transmitting means pivotally supported by said lever and constrained by engagement with a frame mounted link and a pedal mounted link to move bodily with said lever in response to voluntary pedal movement and to move with respect to said pedal and lever to compensate for involuntary movement of the control mechanism caused by bodily movements of the clutch mechanism.

9. In combination, a frame having a power unit therein and movable with respect thereto, a control mechanism for said unit comprising a lever carried by said unit and movable thereon, a shaft mounted on said frame, a pedal rotatably mounted upon said shaft, a torque member pivotally supported by said pedal on an axis disposed transversely to the axis of rotation of said pedal, an actuating link connecting said torque member to said unit carried lever and a reaction means mounted on said power unit and connected to said torque means at a point spaced from said actuating link connection.

10. In combination, a clutch control mechanism comprising a frame and a flexibly mounted motor unit having a clutch mechanism carried thereby, a clutch release lever on said mechanism and movable therewith, a shaft mounted on said frame having a pedal thereon, a torque member pivotally supported by said clutch release lever on an axis at an angle to the axis of lever rotation, an actuating link operatively connecting said torque member and said pedal and a reaction link arranged substantially parallel to said actuating link extending from said torque member to said frame.

11. In combination, a motor vehicle frame having a motor mounted therein for limited movement with respect to the frame in response to torque and motor inertia reactions, a clutch release lever mounted to move with said motor, a clutch pedal rotatably mounted on said frame, a bearing bracket fixed to said pedal having a torque member pivotally mounted therein on an axis transversely arranged with respect to the axis of pedal rotation, a bearing on said member spaced from said pivotal axis, a pin in said bearing rotatably connected to an actuating link and to a substantially parallel reaction link, said actuating link connected to said clutch release lever and said reaction link connected to a pivot adjacent the clutch release lever.

12. In combination, a frame, a power unit movably mounted therein, a lever rotatably mounted on said power unit, a pedal shaft mounted on said frame, a torque transmitting means connected to said pedal and mounted to rotate therewith about the axis of said pedal shaft, said torque transmitting means rotatably mounted to turn on an axis transversely arranged with respect to the axis of rotation of said pedal, an actuating link connected to and extending from said torque transmitting means to said lever and a reaction means secured to said power unit and engaging said torque transmitting means at a point spaced from said link connection to complete the torque couple.

13. In a clutch control mechanism for motor vehicles, a frame having a relatively movable motor unit mounted therein, a clutch on said motor unit having an actuating member rotatably mounted thereon, a torque transmitting means connected to said actuating member and rotatable therewith, said torque transmitting means pivotally mounted on an axis transverse to the axis of said member rotation, a pedal rotatably mounted on said frame, an actuating link operatively connected to said torque transmitting means and said pedal, and a reaction means secured to said frame and engaging said torque transmitting means at a point spaced from said link connection to complete the torque couple.

14. In combination, a frame unit, a power unit movably mounted therein, a rotatably mounted actuated lever carried by said power unit, a manually operated actuating lever carried by said frame unit, means disposed between said two levers to move said power unit lever in response to voluntary movement of said frame unit lever and compensate for involuntary movements of said power unit lever comprising, a torque transmitting member pivotally supported by one of said levers upon an axis transverse to the axis of lever rotation, means connecting said torque transmitting member to said other lever and a reaction means mounted to move with the unit carrying said other lever and arranged to engage said torque transmitting member.

15. In combination, a control mechanism comprising a frame having a movably mounted power unit therein, a lever rotatably mounted on said power unit, a pedal shaft rotatably mounted in said frame, a torque transmitting means rotatably carried by said frame shaft upon an axis transversely arranged with respect to said shaft and constrained to rotate therewith, an actuating link pivoted to said torque transmitting means and said power unit lever, and a reaction means mounted on said power unit and arranged to engage said torque transmitting means.

16. In combination, a support, a mechanism bodily movable with respect to the support, an actuable member on the mechanism, an actuating member mounted on the support, a control means arranged between said two members to transmit voluntary actuating movements from the actuating member to the actuable member and to compensate for bodily movements of the mechanism in the support comprising a torque transmitting means pivotally supported by one of said members, an actuating link connected to said torque transmitting means at one side of the torsional axis of said means and to said other member and a reaction means carried by the part supporting said other member and connected to said torque transmitting means at the other side of said torsional axis to effect a voluntary movement of said actuable member by said actuating member.

17. The combination of a mechanism comprising a body and a lever pivotally supported thereby, a second mechanism comprising a body and a lever pivotally supported thereby, said mechanisms being associated with each other in a relationship permitting relative involuntary movement therebetween, and means for transmitting voluntary movement between said levers without being affected substantially by involuntary movement between said mechanisms comprising a torsional member pivotally supported on a lever of one of said mechanisms about an axis transverse to its torsional axis and a pair of links pivotally connected to the other of said mechanisms at one end and pivotally connected to said torsional member on opposite sides of the torsional axis thereof at the other end, at least one of said links engaging the lever of said last named mechanism.

18. The combination of a mechanism comprising a body and a lever pivotally supported thereby, a second mechanism comprising a body and a lever pivotally supported thereby, said mechanisms being associated with each other in a relationship permitting relative involuntary movement therebetween, and means for transmitting voluntary movement between said levers without being affected substantially by involuntary movement between said mechanisms comprising a torsional member pivotally supported on a lever of one of said mechanisms about an axis transverse to its torsional axis, and a pair of links pivotally connected to the other of said mechanisms at one end and pivotally connected to said torsional member on opposite sides of the torsional axis thereof at the other end at a spaced distance from said first named lever, at least one of said links engaging the lever of said last named mechanism, and both said links lying in a plane substantially transverse to the axis of said torsional member.

19. The combination of a mechanism comprising a body and a lever pivotally supported thereby, a second mechanism comprising a body and a lever pivotally supported thereby, said mechanisms being associated with each other in a relationship permitting relative involuntary movement therebetween, and means for transmitting voluntary movement between said levers without being affected substantially by involuntary movement between said mechanisms comprising a torsional member pivotally supported on a lever of one of said mechanisms about an axis substantially normal to its torsional axis and a pair of links pivotally connected to the other of said mechanisms at one end and pivotally connected to said torsional member on opposite sides of the torsional axis thereof at the other end at a spaced distance from said first named lever, at least one of said links engaging the lever of said last named mechanism, both said links extending substantially parallel to each other and in a plane transverse to the axis of said torsional member.

20. The combination of a pair of mechanisms operatively connected to each other and adapted to have involuntary bodily movement with respect to each other, each of said mechanisms comprising as an operative part thereof a pivotally mounted lever, and means to transmit voluntary movement of one lever to the other irrespective of involuntary movements between said mechanisms comprising a torsional member pivotally supported on one of said mechanisms upon an axis extending across the axis of rotation of the lever and constrained to rotate with the lever of said mechanism, a link operatively connecting said member and the lever of the other of said mechanisms, and reaction means connected with said other mechanism and engaging said member.

21. The combination of a pair of mechanisms supported to have involuntary bodily movement with respect to each other, each of said mechanisms comprising as an operative part thereof a pivotally mounted lever, and means to transmit voluntary movement of one lever to the other irrespective of involuntary movements between said mechanisms comprising a torsional member pivotally supported on one of said mechanisms upon an axis extending across the axis of rotation of the lever and constrained to rotate with the lever of said mechanism, means operatively connecting said member and the lever of the other of said mechanisms, and reaction means connected with said other mechanism and engaging said member.

22. In combination, a clutch control mechanism comprising a frame and a flexibly mounted motor unit having a clutch mechanism carried thereby, a clutch release lever on said clutch mechanism and movable therewith, a shaft mounted on said frame having a pedal thereon, a torque member pivotally connected to said clutch release lever on an axis at an angle to the axis of lever rotation, an actuating link operatively connecting said torque member and said pedal and a reaction means carried by said frame and connected to said torque member.

23. In a motor vehicle, a frame having a movably mounted motor therein, a clutch pedal pivoted on said frame and a clutch mounted on said motor, means to transmit voluntary movements of said clutch pedal to said clutch to actuate same irrespective of involuntary movements of said clutch and motor comprising, a link extending from said pedal and connected to a torque transmitting means at one side of the torsional axis thereof, a clutch lever hinged to said torque transmitting means upon an axis transverse to the axis thereof, said clutch lever operatively connected to said clutch, and a reaction means carried by said frame and pivotally connected to said torque transmitting means.

24. In a motor vehicle, a frame having a movably mounted motor and clutch assembly therein, a clutch pedal pivoted to said frame and actuable by the vehicle operator, means to transmit voluntary movements of said pedal to said clutch irrespective of involuntary movements of said clutch and motor assembly with respect to said frame comprising, actuating link means connected to said pedal and to a torque transmitting means, a reaction means carried by the frame and pivotally secured to said torque transmitting means, and a clutch lever hinged to said last mentioned means upon axis transverse to the torsional axis thereof whereby torque imposed upon said torque transmitting means by said actuating link controls clutch actuation.

25. In a motor vehicle, a frame having a movably mounted motor and clutch assembly therein, a lever pivoted on said frame and a lever operatively connected to said clutch and bodily movable with said assembly, means interposed between said levers to transmit voluntary movements of the frame carried lever to the clutch irrespective of involuntary movements of the motor and clutch assembly relative to the frame comprising a torque transmitting member connected at one end of its torsional axis to a lever carried actuating link and to a reaction member movable with the axis of said last named lever and hinged at the other end of its torsional axis to said other lever, said hinge axis extending transversely of the torsional axis of the torque transmitting member whereby torque imposed by said frame carried lever is transmitted to the clutch through said hinged connection.

26. The combination of a pair of mechanisms supported to have involuntary bodily movement with respect to each other, each of said mechanisms having levers mounted for pivotal movement with respect to axes separately and respectively supported by said mechanisms, and means to transmit voluntary movement of one lever to the other lever irrespective of involuntary movement between said mechanisms comprising a torsional member pivotally connected to one of said levers about an axis transverse to the axis of rotation of said lever and constrained to rotate with said lever, means operatively connecting said member and the lever of the other of said mechanisms, and reaction means connected with said other mechanism and engaging said member.

27. The combination of a pair of mechanisms supported to have involuntary bodily movement with respect to each other, each of said mechanisms having levers mounted for pivotal movement with respect to axes separately and respectively located within said mechanisms, and means to transmit voluntary movement of one lever to the other lever irrespective of involuntary movement between said mechanisms comprising a torsional member having a hinged connection with one of said levers on an axis transverse to the torsional axis of said member and constrained to rotate with said lever of said mechanism, means operatively connecting said member and the lever of the other of said mechanisms, and reaction means connected with said other mechanism and engaging said member.

28. The combination of a pair of mechanisms supported to have involuntary bodily movement with respect to each other, each of said mechanisms having levers mounted for pivotal movement with respect to axes separately and respectively located within said mechanisms, and means to transmit voluntary movement of one lever to the other lever irrespective of involuntary movement between said mechanisms comprising a torsional member having a hinged connection with one of said levers about an axis transverse to the axis of rotation of said lever permitting said lever and member to move about the hinged connection in response to relative involuntary movements of said mechanisms without altering the lever and member relation for the transmission of voluntary movements and constrained to rotate with said lever of said mechanism, means operatively connecting said member and the lever of the other of said mechanisms, and reaction means connected with said other mechanism and engaging said member.

29. In combination a motor vehicle frame having a power unit movably mounted therein, a clutch release lever pivotally mounted on said power unit, a manually operated clutch pedal rotatably mounted on said frame unit, means disposed between said pedal and lever to move said lever in response to voluntary movement of said pedal and compensate for involuntary movements of said clutch release lever comprising a torque transmitting means rotatably connected at one end thereof to said clutch release lever on an axis transverse to the axis of lever rotation to move said lever on its axis as said means is turned on its torsional axis, said means connected at its other end to a link extending from said means to a pivotal mounting on said clutch pedal, and to a reaction means on said frame.

30. In combination, a frame, a motor unit movably mounted therein, a clutch release lever mounted on said motor, a clutch pedal mounted on said frame, means to transmit the voluntary movements of said pedal to said lever and prevent the transmission of involuntary movements therebetween in response to motor movements comprising a torque transmitting means mounted to rotate upon its torsional axis and to rotate upon an axis extending transversely to said torsional axis, one end of said torque transmitting means connected at one side of its torsional axis to said pedal, an actuating link connected at the other end of said torque transmitting means at one side of its torsional axis and to said lever and a reaction link connected at said other end and to said motor unit.

CYRUS B. KURTZ.